C. O. HARRINGTON.
RELAY.
APPLICATION FILED AUG. 27, 1919.

1,372,688.

Patented Mar. 29, 1921.
8 SHEETS—SHEET 1.

INVENTOR.
C. O. Harrington
BY A. L. Verrill
His ATTORNEY.

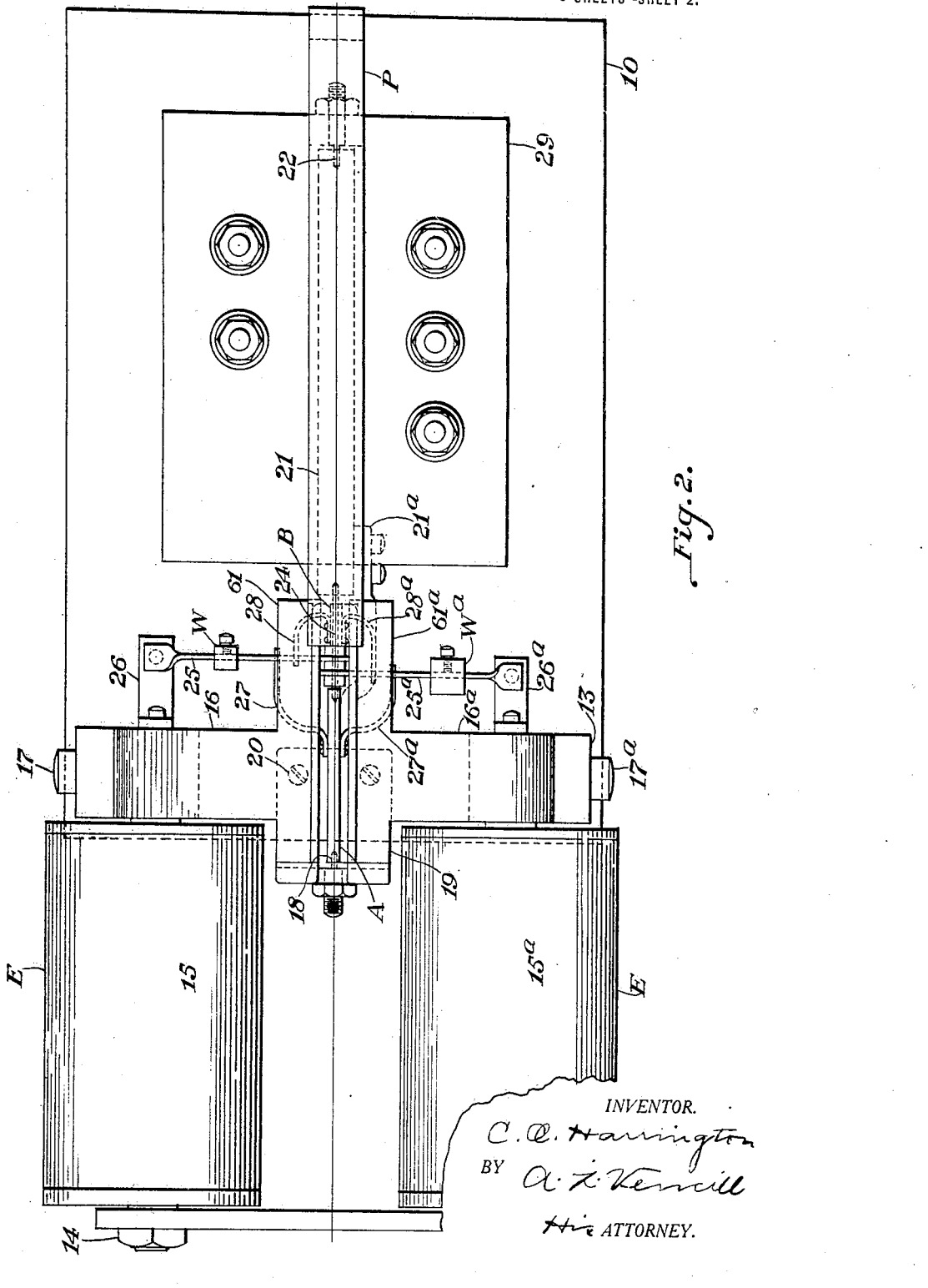

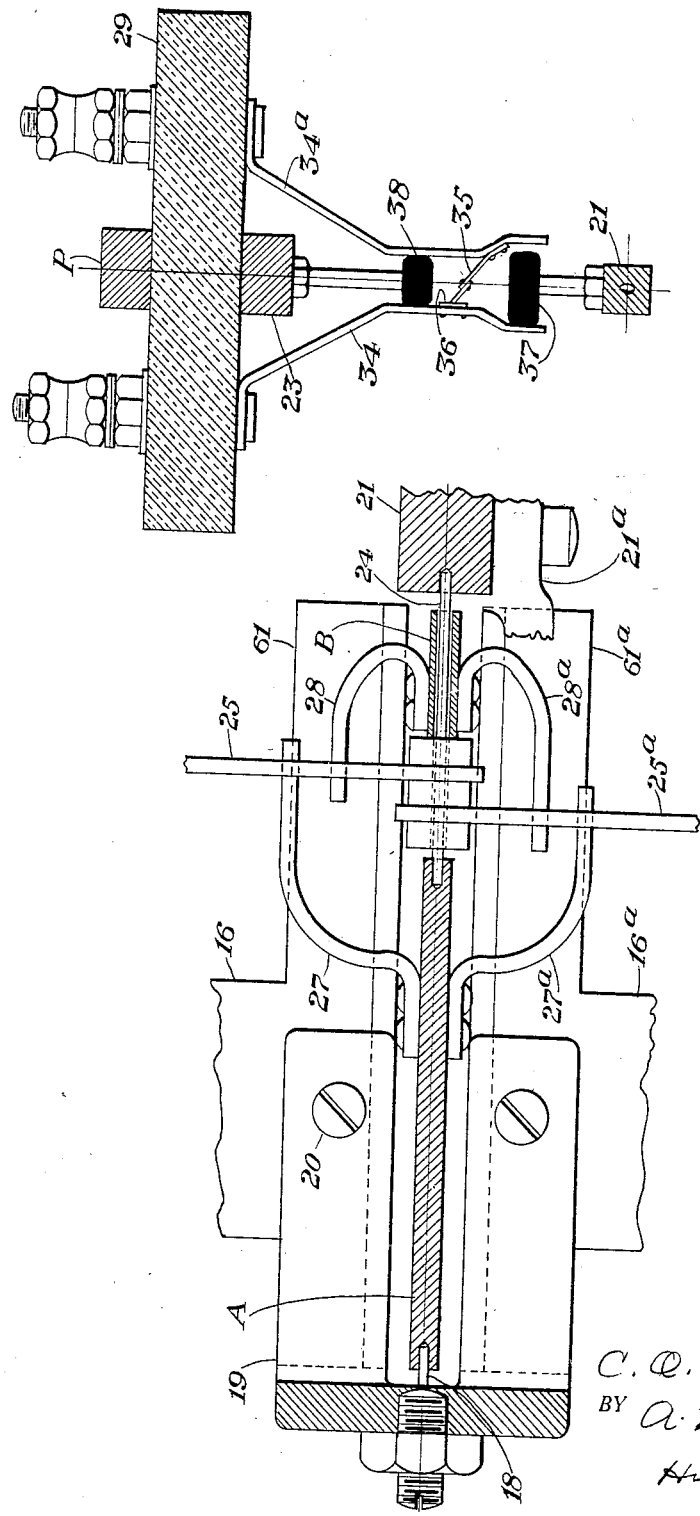

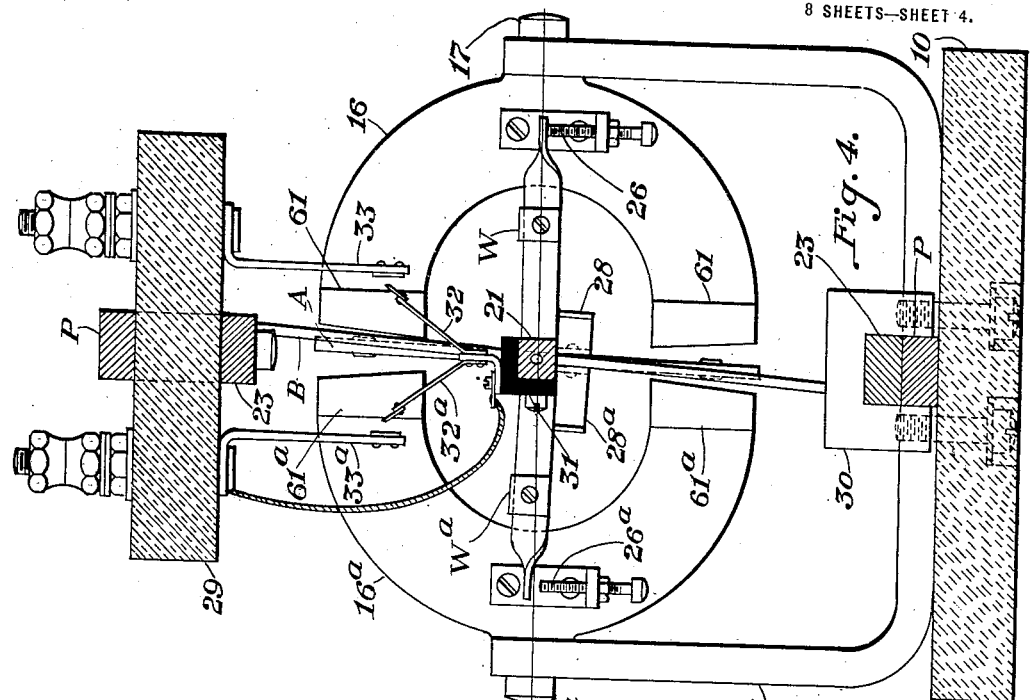
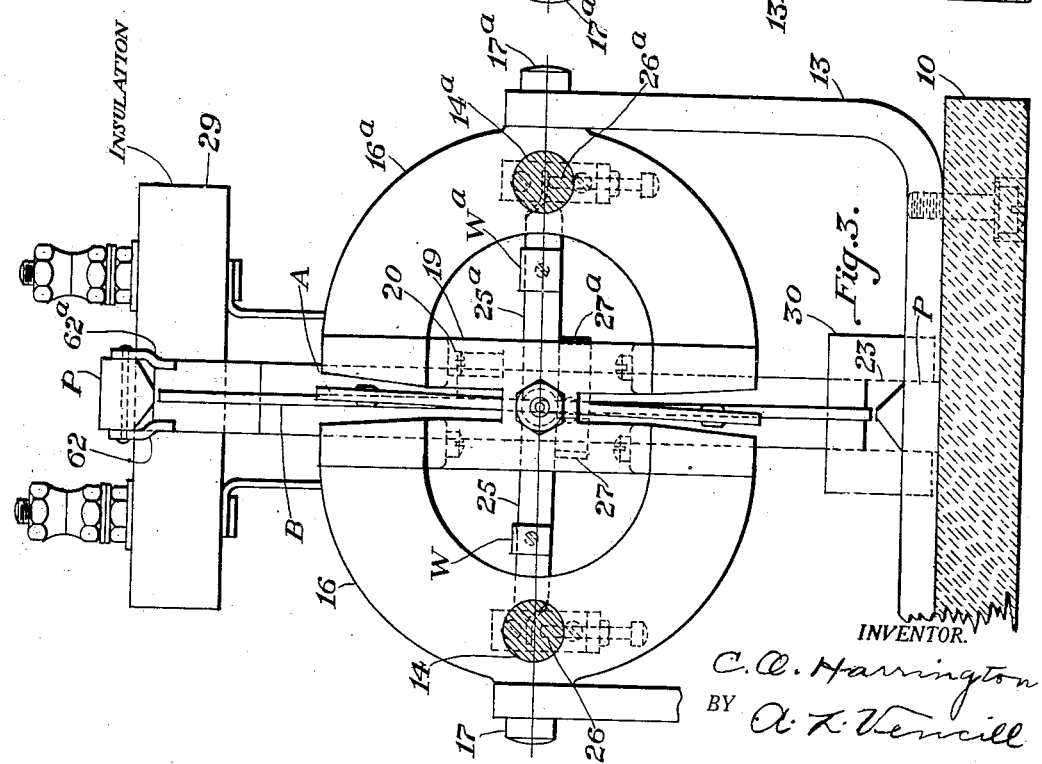

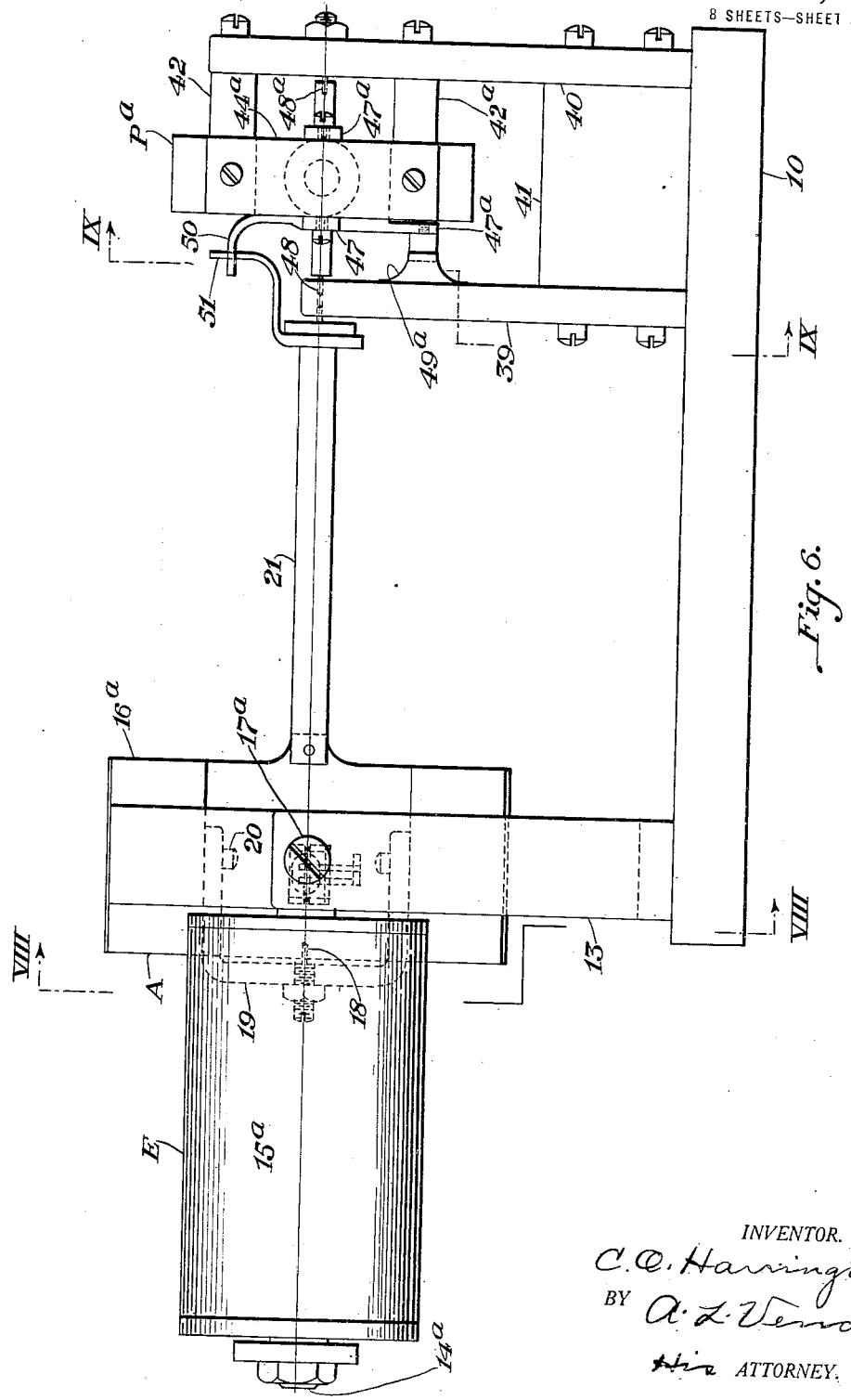

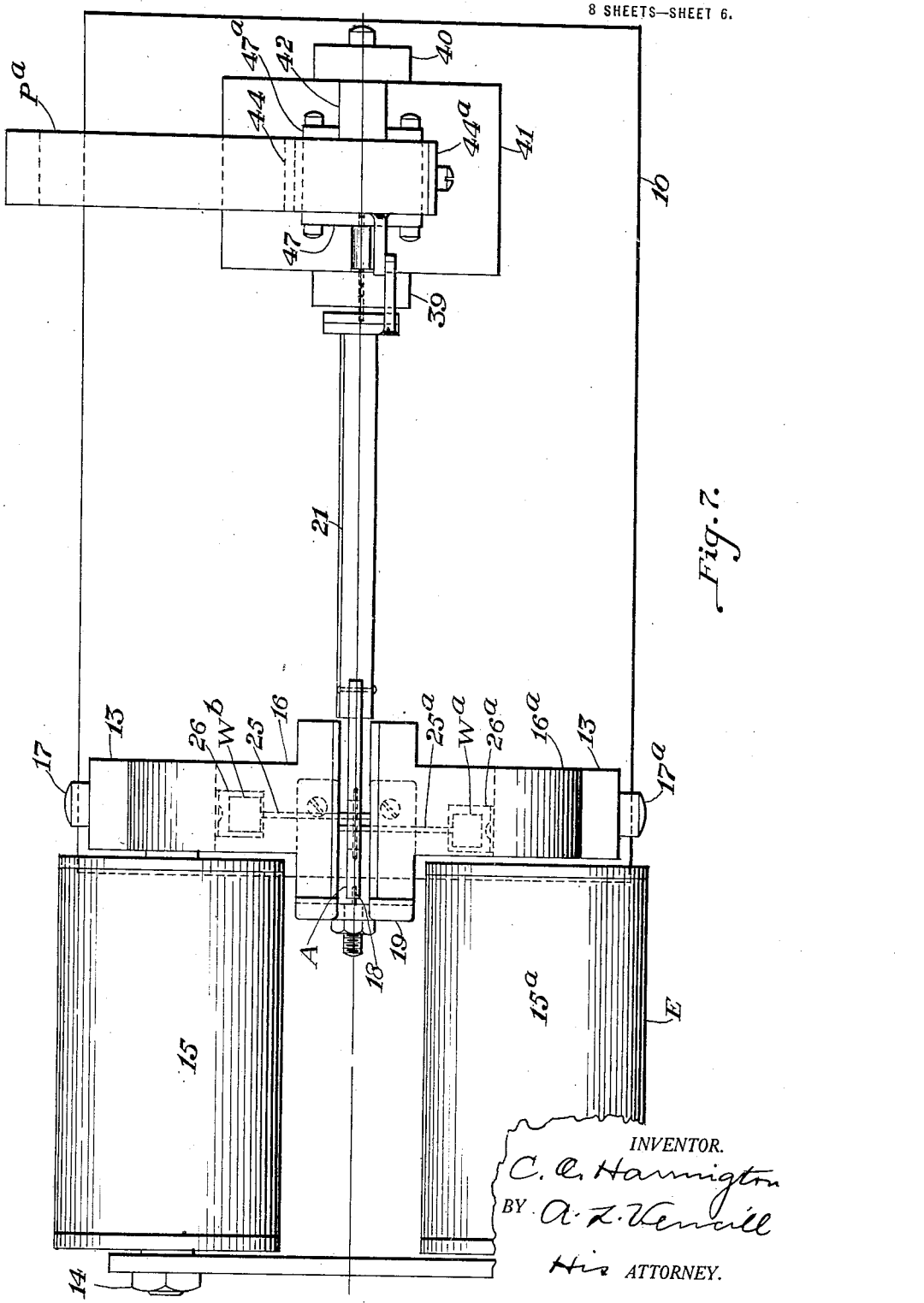

C. O. HARRINGTON.
RELAY.
APPLICATION FILED AUG. 27, 1919.

1,372,688.

Patented Mar. 29, 1921.
8 SHEETS—SHEET 7.

INVENTOR.
C. O. Harrington
BY A. L. Vencill
His ATTORNEY.

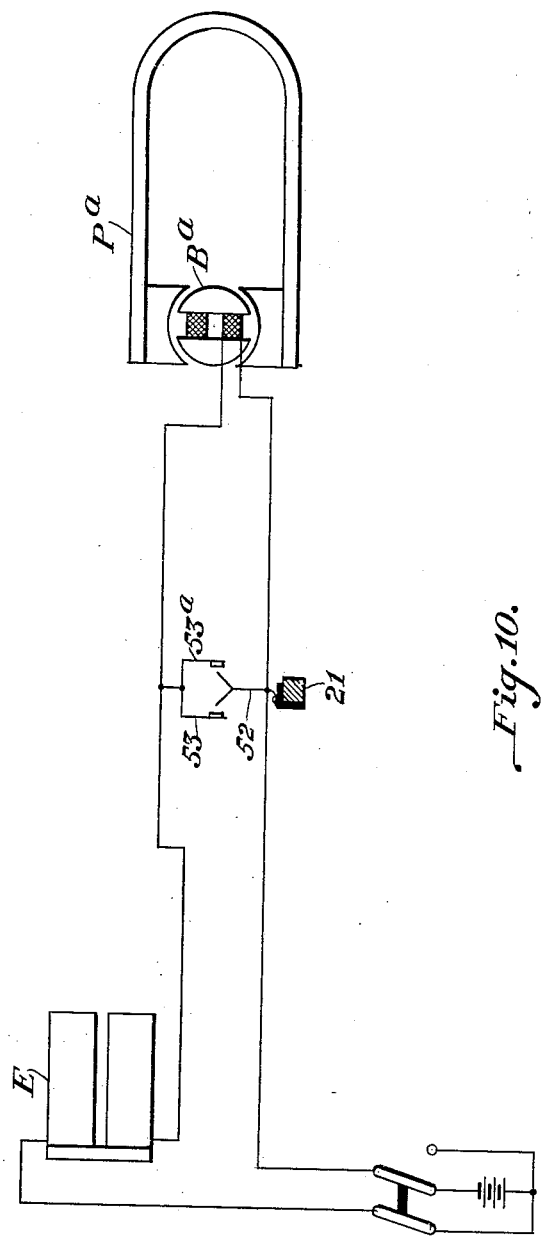

UNITED STATES PATENT OFFICE.

CLINTON O. HARRINGTON, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

RELAY.

1,372,688.   Specification of Letters Patent.   Patented Mar. 29, 1921.

Application filed August 27, 1919. Serial No. 320,124.

*To all whom it may concern:*

Be it known that I, CLINTON O. HARRINGTON, a citizen of the United States, residing at Swissvale, in the county of Allegheny and State of Pennsylvania, have invented certain new and useful Improvements in Relays, of which the following is a specification.

My invention relates to relays, and particularly to polarized direct current relays.

One object of my invention is the provision of a relay of this character having a high degree of efficiency and reliability.

I will describe two forms of relays embodying my invention, and will then point out the novel features thereof in claims.

Figure 1:
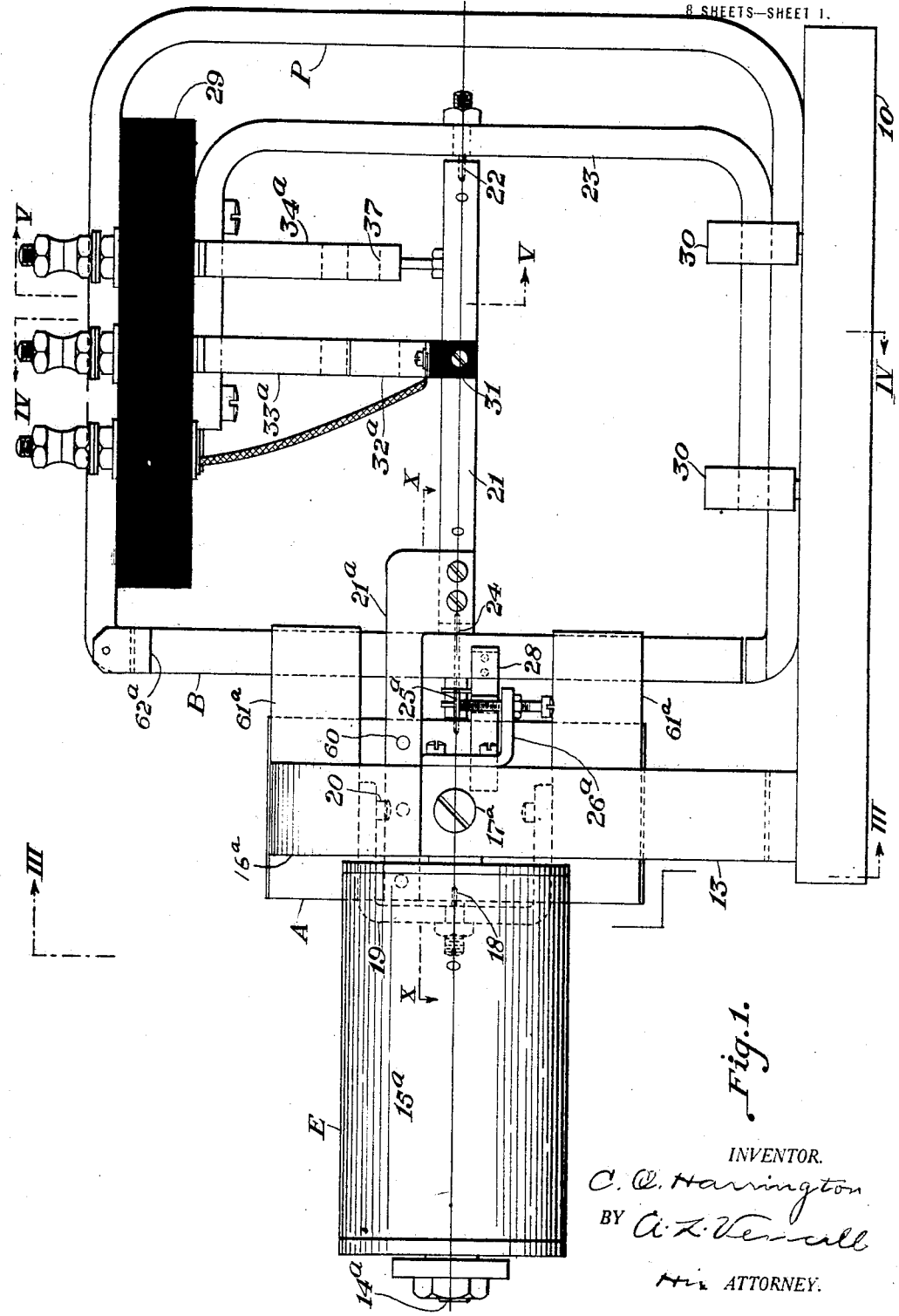
Figure 8:
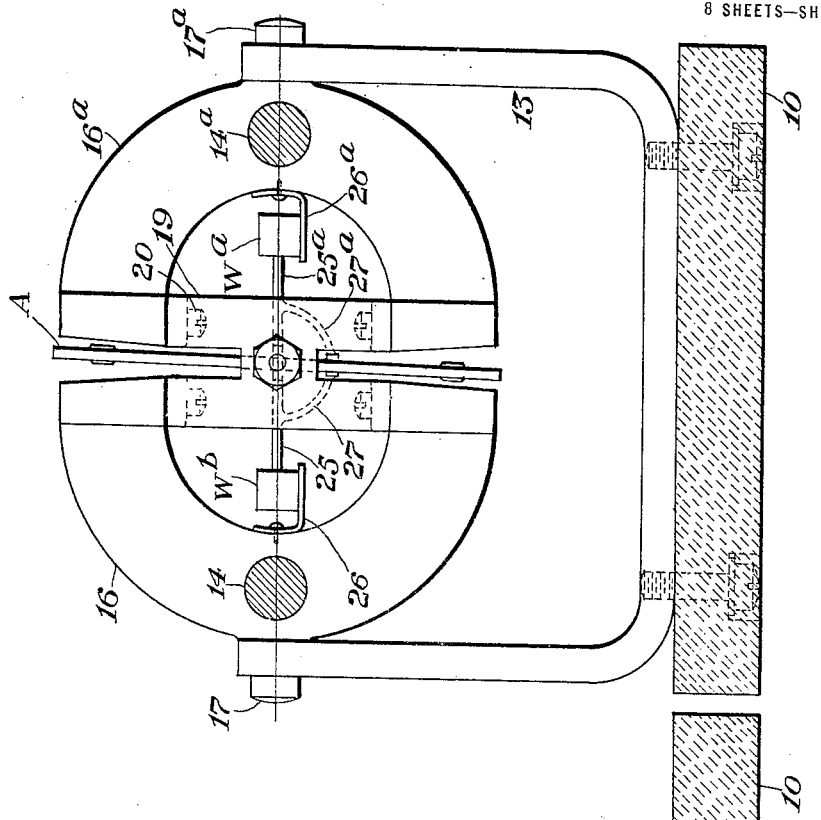
Figure 9:
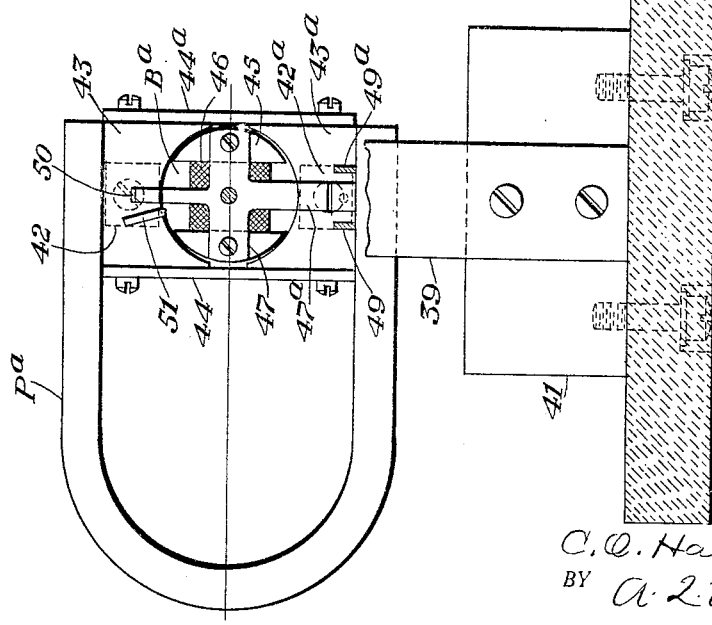

In the accompanying drawings, Figure 1 is a view showing in side elevation one form of relay embodying my invention. Fig. 2 is a top view of the relay shown in Fig. 1. Fig. 2$^a$ is a sectional view on the line X—X in Fig. 1, but on a larger scale than the other views. Fig. 3 is a sectional view taken on the line III—III in Fig. 1 looking in the direction indicated by the arrows. Fig. 4 is a sectional view taken on the line IV—IV in Fig. 1 looking in the direction indicated by the arrows. Fig. 5 is a sectional view taken on the line V—V in Fig. 1 looking in the direction indicated by the arrows. Fig. 6 is a view showing in side elevation a modified form of relay also embodying my invention. Fig. 7 is a top view of the relay shown in Fig. 6. Figs. 8 and 9 are sectional views taken on the lines VIII—VIII and IX—IX respectively in Fig. 6, and looking in the direction indicated by the arrows. Fig. 10 is a diagrammatic view showing one arrangement of controlling circuits which may be employed in connection with the relay shown in Figs. 6 to 9, inclusive.

Similar reference characters refer to similar parts in each of the several views.

Referring first to Figs. 1 to 5, inclusive, the several parts of the relay are supported on a base block 10 of non-magnetic material. Mounted on this block is a U-shaped yoke 13, also of non-magnetic material, which supports an electro-magnet E. This magnet comprises the usual cores 14, 14$^a$, carrying windings 15, 15$^a$, the cores being provided with pole-pieces 16, 16$^a$, which are shaped as best shown in Figs. 3 and 4. That is, each pole-piece is semi-circular in form, and the two pieces are arranged to confront each other in spaced relation, thus forming two pairs of pole-faces, one pair being located above the other. The two faces of each pair are, of course, of opposite polarity. As here shown, the electromagnet E is supported by attaching the two pole-pieces 16 and 16$^a$ to the legs of yoke 13 by means of screws 17 and 17$^a$.

The reference character A designates a non-polarized armature which is pivotally mounted to swing between the pole-faces of the electromagnet and which is attached, by screws 60, to an offset portion 21$^a$ of a horizontal shaft 21. The armature and shaft are pivotally mounted at one end on a pin 18 which enters a suitable hole in the armature and which is carried in a bracket 19 attached to the magnet pole-pieces by screws 20. At the other end, these parts are pivotally mounted on a pin 22 which enters a suitable hole in the end of the shaft, and which is supported in a yoke 23 attached to the base block 10 as hereinafter explained. The pivotal axis of armature A and shaft 21 passes through the middle of the armature; it also passes midway between the pole-pieces 16 and 16$^a$, and is equidistant from the two pairs of pole-faces on these pieces. It follows, therefore, that the armature is capable of swinging in opposite directions from a middle position, wherein it is equidistant from the two faces of each pair of pole-faces, to two extreme positions wherein a given end of the armature engages one pole-piece or the other.

Inasmuch as the armature A is non-polarized, it will be evident that if it is placed in exactly the middle position when electromagnet E is energized, it will remain in such position, but that if it is swung a small distance in either direction from the middle position the action of the magnetic flux will cause it to continue its movement to the extreme position in such direction. I have accordingly provided means for biasing the armature A to a position slightly to one side or the other of the middle position. As here shown, the armature is normally biased to the position shown in Fig. 3, that is, a short distance in clockwise direction from the middle position, this being accomplished in the following manner. A short shaft 24 is mounted in holes in the armature and in the end of shaft 21 (see Fig. 2ª), and carries two counterweight arms 25 and 25ª which are free to swing on the shaft. The two arms are provided with counterweights W and Wª respectively, the latter being considerably heavier than the former. The downward movement of the arms 25 and 25ª is limited by stops 26 and 26ª, respectively, attached to the pole-pieces 16 and 16ª of the electromagnet. Fixed to the armature A are two arms 27 and 27ª which engage with the under sides of the counterweight arms 25 and 25ª, respectively. The parts are so adjusted that when armature A is in the middle position both counterweight arms 25 and 25ª are raised a short distance from their stops 26 and 26ª. Under normal conditions, however, weight Wª swings the armature in clock-wise direction (as viewed in Fig. 3) a distance sufficient to permit arm 25ª to rest on stop 26ª, arm 25 then being lifted from its stop. The parts are so proportioned that under this condition the armature is swung a short distance away from its middle position to the position shown in Fig. 3. If the electromagnet becomes energized while the armature is in this biased position, it is evident that the armature will swing to its extreme clock-wise position, and that in so doing it will elevate weight W; then when the electromagnet becomes deënergized the armature will be returned, due to the influence of this latter weight, to the biased position in which it is shown in Fig. 3.

With only the parts thus far referred to, it is clear that armature A will be swung to its extreme clock-wise position (as viewed in Fig. 3) regardless of the polarity of the current supplied to magnet E. Means are provided, however, for biasing this armature to a position a slight distance on the other side of its middle position when the magnet is energized in one direction, so that the armature will then swing to its counter-clockwise extreme position as viewed in Fig. 3. This means is as follows:

The short shaft 24 carries a soft iron armature B which armature is polarized by a permanent magnet P, and which I will therefore term a "polarized armature." Armature B is located between suitable extensions 61 and 61ª on the pole-faces of magnet E, so that it is swung in one direction or the other according as the magnet is energized in one direction or the other. Armature B carries two arms 28 and 28ª, which engage with the under sides of counter weight arms 25 and 25ª, respectively. The movement of this armature is limited by two stops 62, 62ª, attached to the upper pole of permanent magnet P.

Armature B normally occupies a middle position as shown in Fig. 3, due to the action thereon of counterweight arms 25 and 25ª through arms 28 and 28ª. When magnet E is energized in one direction, this armature swings in clockwise direction, as viewed in Fig. 3, and so it has no effect on the non-polarized armature A because arm 28 then merely raises weight W. When magnet E is energized in the other direction, however, armature B will swing in counter-clockwise direction as viewed in Fig. 3 so that arm 28ª will raise weight Wª. Weight W will then swing the non-polarized armature A in counter-clockwise direction (Fig. 3) to a position a slight distance the other side of its middle position, so that the parts will be as shown in Fig. 4. Magnet E will then, of course, cause armature A to swing to its extreme counter-clockwise position as viewed in Fig. 3. When magnet E is subsequently deënergized, weight Wª will return armature B to its middle position and armature A to the position to which it is normally biased.

The permanent magnet P, as best shown in Fig. 1, comprises two horizontal legs, one of which lies flat on the base block 10. Located between these legs is the yoke 23, the lower leg of the yoke and the lower leg of the magnet P being rigidly attached to the block 10 by clamps 30. Between the upper legs of magnet P and yoke 23 is a terminal block 20 of insulating material which carries contacts co-acting with contact members operated by shaft 21, the contact arrangement being as follows:

Fixed to the shaft 21 is a block 31 of insulating material (see Figs. 1 and 4) which carries two contact fingers 32 and 32ª co-acting, respectively, with two fixed contact members 33 and 33ª mounted on block 29. These contacts are so arranged that one contact 32—33 is closed when armature A swings to one extreme position, and the other contact 32ª—33ª is closed when this armature swings to the other extreme position, but that both of these contacts are open when armature A is in either of its biased positions. These two contacts may be termed the "front" contacts of the relay.

A "back" contact is also provided, comprising (see Figs. 1 and 5) two spring arms 34 and 34ª mounted in block 29, the latter arm carrying a contact finger 35 which co-acts with an anvil 36 on arm 34. The arms 34 and 34ª extend downwardly below the contact finger 35 for engagement with a block 37 of insulating material carried by shaft 21. The arms normally assume the positions shown in Fig. 5, so that contact 35—36 is closed, but when armature A is swung to one extreme position or the other, block 37 moves one or the other of the arms 34 or 34ᵃ outwardly and so causes this contact to open. The inward movement of the arms 34 and 34ᵃ is limited by a fixed stop 38 of insulating material projecting downwardly from yoke 23. As will be evident from Fig. 5, there is sufficient lost motion between block 37 and arms 34, 34ᵃ to permit armature A to assume either of its biased positions without opening contact 35—36.

It is, of course, apparent that the polarized armature B could be used to operate the contacts, thus eliminating the non-polarized armature A entirely. The reason for not doing this is the danger that the polarized armature, owing to the very fact that it is polarized, may stick in one of its extreme positions after the relay is deënergized; whereas armature A, owing to the fact that it is not polarized, is very unlikely to stick in an extreme position. With the construction shown, if armature B should stick in an extreme position when the relay is deënergized, armature A will return to one or the other of its biased positions, and so will open both front contacts 32—33, and 32ᵃ—33ᵃ, and will close the back contact 35—36.

The reason for biasing armature A normally to one side of its middle position is as follows: If this armature were biased to the middle position, and armature B were utilized to give armature A an impulse in one direction or the other depending on the polarity of the current supplied to the relay, the relay would operate reliably as long as the polarized armature continued to function. If this armature should fail, however, armature A might swing in the proper direction and it might not. The relay is intended primarily for the control of railway signals, and when so used this matter cannot be left to chance. The relay will be so connected in the signal circuits that when armature A continues to the extreme position in the direction of its normal bias, the 45° or caution indication circuit will be closed, and that the 90° or proceed indication circuit will be closed when this armature swings to the other extreme position. It follows, then, that if polarized armature B fails to function, the relay will cause the signal to indicate "caution" when it should indicate "proceed," but that it cannot cause the signal to indicate "proceed" when it should indicate "caution." In other words, such failure would be on the side of safety.

Referring now to Figs. 6 to 9, inclusive, the relay shown in these views is in general the same as that shown in the preceding views except that the polarizing armature is of the wire-wound type instead of the soft iron bar type. There are other slight differences which will be pointed out in the following description.

In Figs. 6 to 9, the electromagnet E and armature A are the same as in Figs. 1 to 5, except that the counterweights Wᵃ and Wᵇ are of the same values so that they exert equal torques on armature A. These counterweights bias the armature slightly in counterlockwise direction from the middle position, as viewed in Fig. 8. The counterweights rest on stops 26 and 26ᵃ attached to pole-pieces 16 and 16ᵃ in substantially the same manner as in Figs. 1 to 5.

Mounted on the base block 10 is a block 41 to which are attached two upright members 39 and 40 of non-magnetic material. Member 39 serves as a pivotal support for one end of shaft 21, the other end of which is fixed to armature A. This armature is pivotally mounted in bracket 19 at point 18 as in Fig. 1. Projecting from the upright member 40 are two spaced horizontal bars 42 and 42ᵃ to which two soft iron pole-pieces 43 and 43ᵃ are attached, these pole-pieces being properly spaced by straps 44 and 44ᵃ. Attached to the pole-pieces are the two legs of a permanent magnet Pᵃ.

The reference character Bᵃ designates a polarized armature comprising a soft iron drum or bobbin 45 provided with a winding 46. The bobbin 45 is provided with end plates 47 and 47ᵃ by which it is pivotally mounted at 48 and 48ᵃ in the upright members 39 and 40. Armature Bᵃ is biased to the middle position, wherein it is shown in Fig. 9, by a weight in the form of a downwardly projecting arm 47ᵃ which is integral with end plate 47, and this arm coacts with two fixed stops 49 and 49ᵃ on member 39 to limit the swing of the armature. Winding 46 is included in the circuit of electromagnet E, so that armature Bᵃ will be swung in one direction or the other from its middle position according as current of one polarity or the other is supplied to this circuit. The end plate 47 is provided with an upwardly extending arm 50 which coacts with an arm 51 carried by shaft 21 to swing this shaft and armature A to a position slightly beyond the middle position in counter-clockwise direction (as viewed in Fig. 8) when armature Bᵃ is swung to the limit of its stroke in counter-clockwise direction as viewed in Fig. 9.

The operation of the relay shown in Figs. 6 to 9 is as follows: When the relay is energized by current of what I will term normal polarity, the polarized armature Bᵃ will swing in clockwise direction from its middle position, as viewed in Fig. 9, so that it will not interfere with the clockwise movement of the non-polarized armature A to its extreme position. Armature A will, therefore, swing to its extreme clockwise position, and in so doing it will elevate the counterweight W<sup>b</sup>. As soon as the relay becomes deënergized, this counterweight will return armature A to the position to which it is normally biased, whereas armature B<sup>a</sup> will also return to its middle position, due to the action of counterweight 47<sup>a</sup>. When the relay is energized by current of the opposite or reverse polarity, armature B<sup>a</sup> will swing in counter-clockwise direction until it is stopped by the engagement of counterweight 47<sup>a</sup> with the fixed stop 49<sup>a</sup>. This movement of the polarized armature is sufficient to swing armature A to a position a slight distance the other side of its middle position, whereupon magnet E causes this armature to swing to its extreme counter-clockwise position. This movement of armature A, of course, elevates the counterweight W<sup>a</sup>, so that upon deënergization of the relay the armature A is returned to its normal position.

Shaft 21 may be used to control contacts in the same manner as in the case of the relay shown in Figs. 1 to 5, but these contacts are omitted to simplify the drawings.

If desirable, the scheme shown in Fig. 10 may be employed in connection with the relay shown in Figs. 6 to 9. Referring to Fig. 10, the relay is provided with an additional contact finger 52, which is operated by shaft 21, and which engages with a contact member 53 or a contact member 53<sup>a</sup> when the non-polarized armature A has swung approximately half way to its extreme position in one direction or the other. When contact 52—53 or contact 52—53<sup>a</sup> is closed, it forms a shunt around the winding of the polarized armature B<sup>a</sup> so that this armature then returns to its middle position. This arrangement, of course, increases the torque on the non-polarized armature, and it has the advantage of minimizing the chance of the polarized armature B<sup>a</sup> freezing or sticking in either extreme position.

If the armature B<sup>a</sup>, in Figs. 6 to 9, sticks in the middle position, the normal bias of the non-polarized armature A insures movement of this armature in such direction as to close the 45° or caution indication circuit of the signal in the same manner as explained hereinbefore in connection with the relay shown in Figs. 1 to 5. If armature B<sup>a</sup> should stick in either extreme position, armature A will return to one of its biased positions as soon as the relay is deënergized, and so will open the "front" contacts and close the "back" contacts as in the case of the relay shown in Fig. 1.

Although I have herein shown and described only two forms of relays embodying my invention, it is understood that various changes and modifications may be made therein within the scope of the appended claims without departing from the spirit and scope of my invention

Having thus described my invention what I claim is:

1. A relay comprising a non-polarized armature pivotally mounted intermediate its ends, an electromagnet having pole-pieces located on opposite sides of said armature and extending in both directions from the pivotal point of the armature to provide a pair of pole-faces adjacent each end of the armature, means for normally biasing said armature to a position slightly to one side of a middle position wherein it is equally spaced from the pole-faces of each pair, means controlled by said electromagnet when energized in one direction for biasing said armature to a position slightly to the other side of said middle position, and a contact controlled by said armature.

2. A relay comprising a non-polarized armature pivotally mounted intermediate its ends, an electromagnet having pole-pieces located on opposite sides of said armature and extending in both directions from the pivotal point of the armature to provide a pair of pole-faces adjacent each end of the armature, means for normally biasing said armature to a position slightly to one side of a middle position wherein it is equally spaced from the pole-faces of each pair, a polarized armature also located between said pole-pieces for biasing said non-polarized armature to a position slightly to the other side of said middle position when the electromagnet is energized in one direction, and a contact controlled by said non-polarized armature.

3. A relay comprising an electromagnet having an elongated pole-piece providing two pole-faces of the same polarity, a non-polarized armature pivotally mounted intermediate its ends and at a point between said pole-faces so that it may swing from a middle position wherein it is equally spaced from said pole-faces to two extreme positions wherein one end of the armature or the other engages one pole-face or the other, means for normally biasing said armature to a position slightly to one side of said middle position, means controlled by said electromagnet when energized in one direction for biasing said armature to a position slightly to the other side of said middle position, and a contact controlled by said armature.

4. A relay comprising a pivotally mounted non-polarized armature, an electro-magnet arranged to swing said armature in opposite directions from a middle position to one extreme position or another according as the armature is initially biased in one direction or the other from said middle position, means for initially biasing said armature to a position slightly to one side or the other of said middle position, and a contact controlled by said armature.

5. A relay comprising a pivotally mounted non-polarized armature, an electromagnet arranged to swing said armature in opposite directions from a middle position to one extreme position or another according as the armature is initially biased in one direction or the other from said middle position, means for initially biasing said armature to a position to one side or the other of said middle position, and two contacts controlled by said armature one or the other of which is closed according as the armature is swung to one extreme position or the other.

6. A relay comprising a pivotally mounted non-polarized armature, an electromagnet arranged to swing said armature in opposite directions from a middle position to one extreme position or another according as the armature is initially biased in one direction or the other from said middle position, means for initially biasing said armature to a position to one side or the other of said middle position, and a contact controlled by said armature and closed when the armature occupies either of said biased positions but opened when the armature is swung to either extreme position.

7. A relay comprising a pivotally mounted non-polarized armature, an electromagnet arranged to swing said armature in opposite directions from a middle position to one extreme position or another according as the armature is initially biased in one direction or the other from said middle position, means for initially biasing said armature to a position to one side or the other of said middle position, a contract controlled by said armature and closed when the armature occupies either of said biased positions but opened when the armature is swung to either extreme position, and two other contacts one or the other of which is closed according as said armature is swung to one extreme position or the other.

8. A relay comprising a pivotally mounted non-polarized armature, an electromagnet arranged to swing said armature in opposite directions from a middle position to one extreme position or another according as the armature is initially biased in one direction or the other from said middle position, two counterweights acting on said armature for biasing the latter to positions slightly to one side or the other of said middle position, one counterweight exerting a greater torque than the other on the armature, means controlled by said electromagnet when energized in one direction for relieving said armature of the influence of said counterweight of greater torque, and a contact controlled by said armature.

9. A relay comprising a pivotally mounted non-polarized armature, an electromagnet arranged to swing said armature in opposite directions from a middle position to one extreme position or another according as the armature is initially biased in one direction or the other from said middle position, two counterweights acting on said armature for biasing the latter to positions slightly to one side or the other of said middle position, one counterweight exerting a greater torque than the other on the armature, a polarized armature also controlled by said electromagnet and swung in one direction or the other according as the electromagnet is energized in one direction or the other, means operated by said polarized armature when swung in one direction for relieving said non-polarized armature of the influence of said counterweight of greater torque, and a contact controlled by said non-polarized armature.

10. A relay comprising a pivotally mounted non-polarized armature, an electromagnet arranged to swing said armature in opposite directions from a middle position to one extreme position or another according as the armature is initially biased in one direction or the other from said middle position, means for normally biasing said armature to a position slightly to one side of said middle position, a polarized armature also controlled by said electromagnet and swung in one direction or the other according as the electromagnet is energized in one direction or the other, means operated by said polarized armature when swung in one direction for biasing said non-polarized armature to a position slightly to the other side of said middle position, and a contact controlled by said non-polarized armature.

11. A relay comprising an electromagnet, a non-polarized armature pivotally mounted to swing between the pole-faces of said electromagnet, means for normally biasing said armature to a position slightly to one side of a middle position wherein it is equally spaced from said pole-faces, means controlled by said electromagnet when energized in one direction for biasing said armature to a position slightly to the other side of said middle position, and a contact controlled by said armature.

12. A relay comprising an electromagnet, a non-polarized armature mounted between the pole-faces of said electromagnet so that it may swing from a middle position wherein it is equally spaced from said pole-faces to two extreme positions wherein the armature engages one pole-face or the other, means for normally biasing said armature to a position slightly to one side of said middle position, means controlled by said electromagnet when energized in one direction for biasing said armature to a position slightly to the other side of said middle position, and a contact controlled by said armature.

13. A relay comprising a pivotally mounted non-polarized armature, an electromagnet arranged to swing said armature in opposite directions from a middle position to one extreme position or another according as the armature is initially biased in one direction or the other from said intermediate position, means for initially biasing said armature to a position to one side of said intermediate position, means controlled by said electromagnet when energized in one direction for biasing said armature to the other side of said middle position, and a contact controlled by said armature.

In testimony whereof I affix my signature in presence of two witnesses.

CLINTON O. HARRINGTON.

Witnesses:
 A. HERMAN WEGNER,
 H. NASH.